(No Model.) 4 Sheets—Sheet 1.
N. SCHENK.
CORRECT POSITION ATTAINER FOR VIOLIN PLAYERS.
No. 556,216. Patented Mar. 10, 1896.
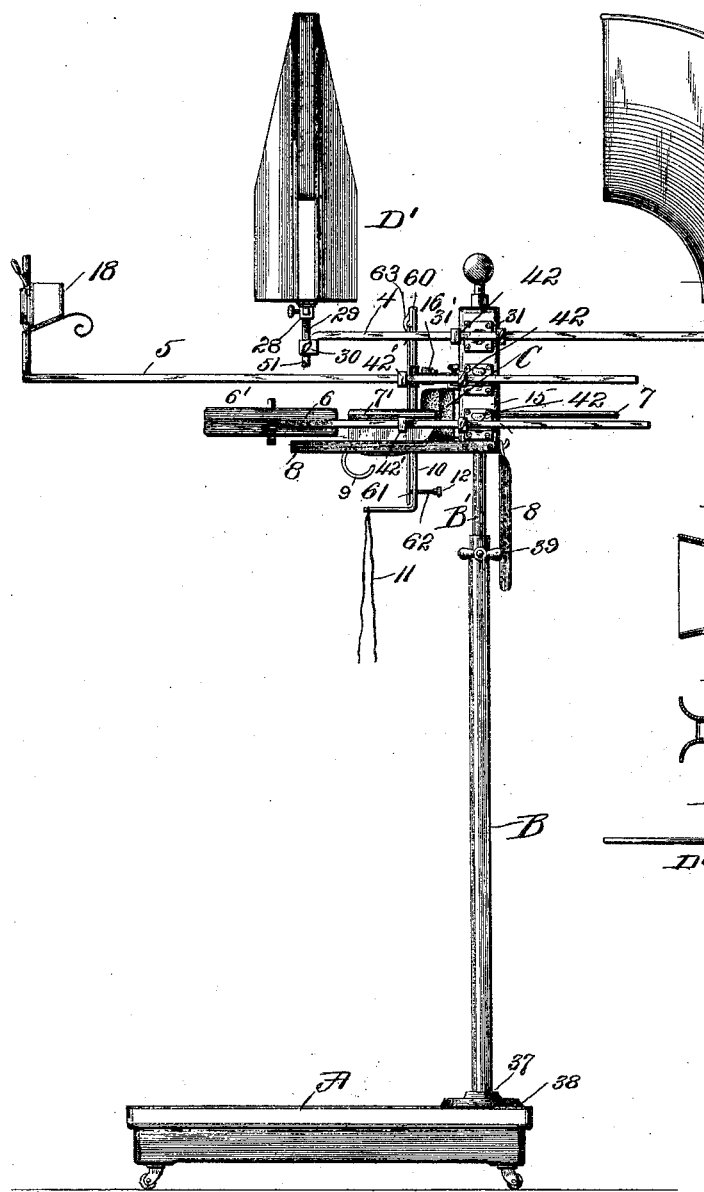
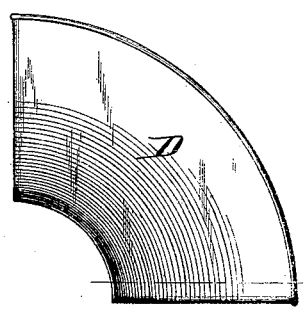
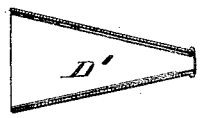
Attest:
H. C. Shob.
Wm H. ___
Inventor:
Nicholas Schenk.
By E. J. O'Brien
Atty.

(No Model.) 4 Sheets—Sheet 2.
N. SCHENK.
CORRECT POSITION ATTAINER FOR VIOLIN PLAYERS.
No. 556,216. Patented Mar. 10, 1896.
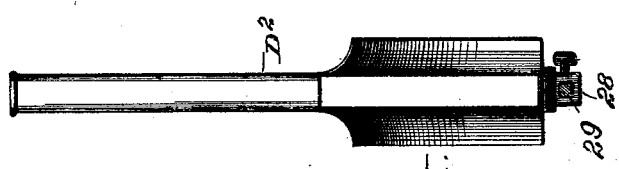
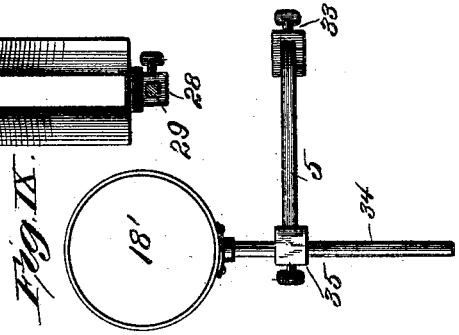
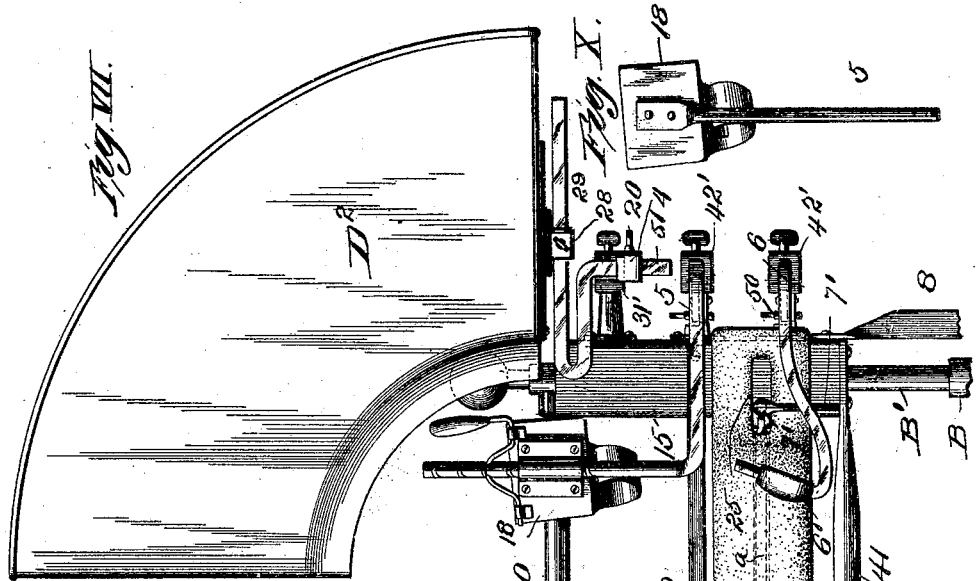

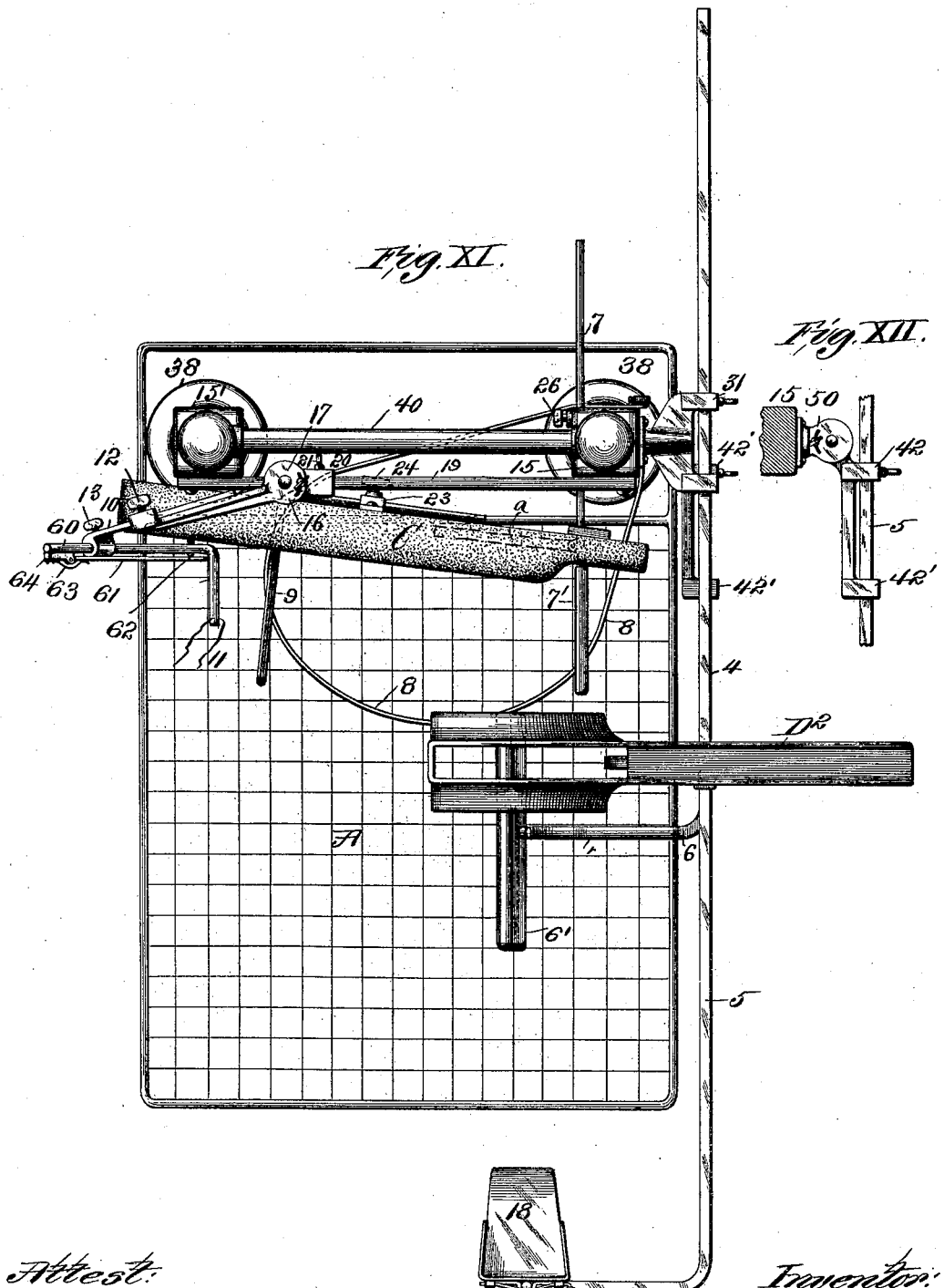

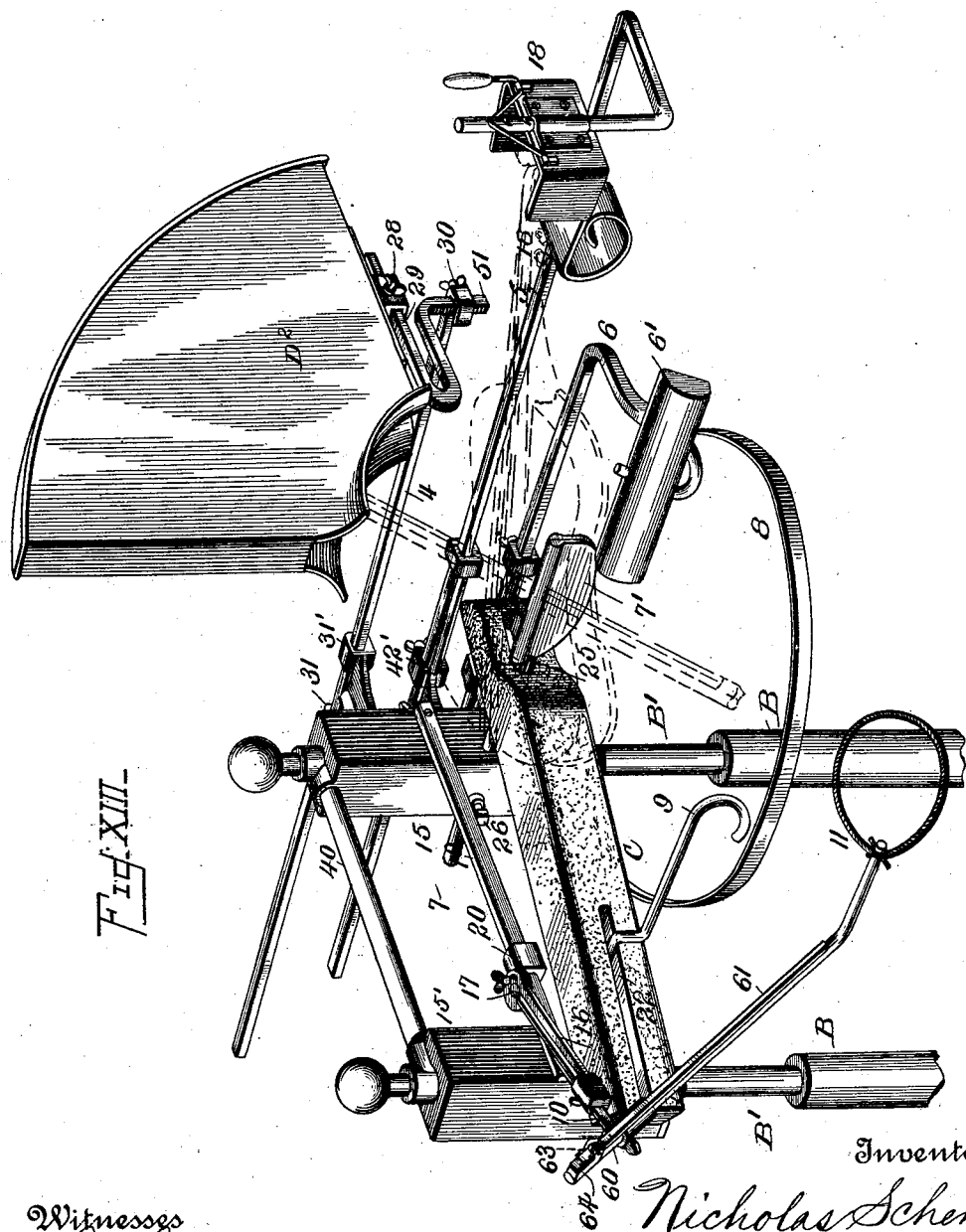

UNITED STATES PATENT OFFICE.

NICHOLAS SCHENK, OF ST. LOUIS, MISSOURI.

CORRECT-POSITION ATTAINER FOR VIOLIN-PLAYERS.

SPECIFICATION forming part of Letters Patent No. 556,216, dated March 10, 1896.

Application filed July 27, 1895. Serial No. 557,339. (No model.)

*To all whom it may concern:*

Be it known that I, NICHOLAS SCHENK, a citizen of the United States, residing at the city of St. Louis, in the State of Missouri, have invented a new and useful Improvement in Correct-Position Attainers for the Violin, of which the following is a specification.

My invention relates to means for use in adapting beginners, in the study of the art of violin music, to a perfect position, through the use of appliances which are a physical aid to the limbs and muscles of the human body employed in holding the instrument and wielding the bow; and it consists of a form wherein the student is placed by an instructor which is provided with a variety of fixed and movable parts acting harmoniously together and susceptible of adjustment so as to accommodate the student's size while the same parts perform their respective functions in each case, and the objects of my invention are, first, to facilitate and simplify the acquisition of a knowledge and practice in the art of violin-playing; second, afford instructors on the violin an apparatus wherein they may correctly position a beginner and preserve the same throughout the lesson; third, give to beginners a taste for learning to play the violin by relieving them of uncertainty in the matter of proper position and action while engaged in their lessons. I achieve these objects by the forms and mechanism illustrated in the accompanying drawings, in which—

Figure 1 is a side view of my correct-position attainer for the violin complete and ready to receive the student. Fig. 2 is a detail drawing which shows the side of the segmental guide that controls the motion of the bow at its outer end. Fig. 3 is a sectional view of the segmental guide shown in Fig. 2 modified by angular sides. Fig. 4 is a sectional view of the segmental bow-guide shown in Fig. 2. Fig. 5 is a plan view of metal-rod bow-guide and is a modification of the bow-guide shown in Figs. 1 and 2. Fig. 6 is a side elevation of the metal-rod bow-guide shown in Fig. 5. Fig. 7 is a front view showing the upper section of my correct-position attainer for the violin. Fig. 8 is a detail end view of the bow-guide 2 shown in Fig. 2, showing modification of partial flaring opening. Fig. 9 is a detail showing modification for holder of violin-head. Fig. 10 is a detail showing the violin head-rest. Fig. 11 is a top view of the correct-position attainer for the violin complete with the back-rest adjusted to a slight angle. Fig. 12 is a detail section showing mode of adjustment of the lower rods, supporting-rests, and arms. Fig. 13 is a perspective view of the complete device with the position of the violin indicated in dotted lines.

Similar letters and figures refer to similar parts throughout the different views.

Referring to the drawings, A represents a low platform about eighteen inches by twenty-four inches in area, substantially made of either wood or metal and mounted on rollers to facilitate moving it about. It is provided on its inner side with two sockets 37, provided with socket-plates 38, screwed to the platform, the inside of the sockets and plates being threaded to receive the end of the annular tube-uprights B, and hold them securely fastened thereto.

The uprights B are preferably made of metal hollow on the inside to receive and hold the extension part B' B' of the uprights B B, the former being telescoped into the latter and held at the desired height by the set-screw 39. Surmounting each of the inner uprights B' B' is a square block about two and a half by nine inches or thereabout, marked 15 15', separated by the bar 40 on top and the bar 41 at the bottom. At the right side of the block 15 are located two swinging bracket-hinges (see Fig. 12) provided with the casings 42 and 42' and one fixed bracket which receives the longitudinal arms 4, 5 and 6, and holds them in place by means of set-screws.

The back rest or cushion C extends between the blocks 15 15', and it is hinged at its left-hand end to the block 15' by the hinges 27' 27, from which point it is susceptible of adjustment at an angle outwardly from the block 15 on the rod 7, which passes through the block 15 and is held in position by the set-screw 26. The rod 7 terminates at its outer end in the semiannular rest 7', which is adapted to fit under the left arm-pit. The rod 7 and the rest 7' are joined by a pivot within the slot 25 of the cushion C to a sliding support $a$ fitting in a recess or mortise in the cushion. It will be readily seen that the set-screw 26 holds the rod in its adjusted position and that the cushion is held against sliding on said rod by the support $a$, which, at the same time, slides freely in the recess of said cushion to permit its adjustment.

The removable and adjustable arm 6 has a cross-rest 6', upon which the left arm of the student reposes. It is susceptible of being lengthened or shortened longitudinally by the hinged bracket constructed as shown in Fig. 12. Similarly supported and adjustably located is the lever-arm 5, on the outer end of which and inclined inwardly is the violin head-rest 18, which is adjustable longitudinally by the device illustrated particularly in the hinged bracket seen in Fig. 12, which receives and holds the lever-arm supporting said head-rest. The rest itself is a metallic case approximately square in cross-section, Figs. 1 and 10, and a modified form of the same consists of an annular tube 18' about four and a half inches long by about the same in diameter, as shown in Fig. 9. When the form shown in Fig. 9 is used, a slightly-different form of holding device is employed, as instead of bending the end of the lever-arm 5 a square collar and thumb-screw 35 holds the upright rod 34 in position.

The arm 4, carrying the bow guide or guides, is like the other carrying-arms, being a square rod, which is held to the block 15 by the adjustable collars 31 31'. It has attached to its outer end an auxiliary bent arm 29, upon which the bow-guide is laterally adjustable, and said bent arm and the bow-guide are also perpendicularly adjustable on the lever-rod 4 in the manner before alluded to. It is not necessary that these lever-rods and auxiliary parts should be square in cross-section, as it is manifest that a round or other shaped rod would answer the same purposes. The bow-guide D is made in three forms for new beginners, medium, and advanced pupils. The first, D', is shown in end view in Fig. 1 and in cross-section in Fig. 3 and consists of a narrow quadrantal casing with the sides flaring from its inner smaller arc or curved edge to its outer larger arc or curved edge. The second form, $D^2$, Fig. 2, for medium-advanced pupils, is straight in cross-section of both its sides and is slightly turned outwardly at its mouth, as shown in cross-section by Fig. 4. The third form, $D^3$, is a bent metallic rod and is intended for advanced pupils. Aside from these differences in form the several bow-guides are mounted and adjusted on their respective bearings, as I have before shown.

19 is a square metal rod located just over the cushion C between the blocks 15 15'. This rod has located on it by the square collar 20 the hinged arm 16, which swings upon the annular pivotal hinge 17 and is laterally adjustable on the rod 19 by the thumb-screw 21. The outer end of this arm 16 terminates in a square or oblong collar provided with a set-screw 12 and made to receive the extension-piece 10. This latter part in turn ends in a double collar or opening which receives and operates the upwardly-extending arm 60, which is bent at an angle at its lower end and fits on the back of the right arm of the student and above the elbow and prevents the bow-arm from moving backwardly out of place.

11 designates a cord or string secured to the lower bent end of the arm 60 and adapted to be tied around the right arm of the pupil above the elbow to hold it steady. At the upper end of the arm 60 is a lug 64, to which is pivoted a bar 61, the lower end of which is held against a set-screw 62 in the lower portion of the arm 60 by means of a spring 63 on the said lug 64, as clearly shown. The collar 20 can be shifted to any point along the bar 19 and the arm 16 swung out and the extension-piece adjusted so as to bring the lower end of the arm 60 lightly against the side of the pupil's body. The set-screw 62 is then adjusted so as to bring the bar 61 into a plane parallel with the bar 19 and substantially coincident with the plane of the pupil's back. The bowing-arm will thus be prevented from swinging back of the body and the pupil prevented from bowing otherwise than in a correct and graceful manner.

A flexible strap 8 is secured to the block 15 and is adapted to be passed around the pupil's body, under the cushion C and thence to the block 15, and fastened so as to hold the pupil in proper position against the cushion and the rest 7'. A rod 9 is adjustably secured to the back of the cushion by a set-screw 23 and projects through and in advance of the same and is adapted to bear against the side of the pupil's body to aid the strap 8 in maintaining the pupil in the proper position. The rod and strap may be used alternately or together. For small pupils the use of both is advisable, while with larger pupils the rod 9 alone will generally be found sufficient.

In operation the pupil is placed upon the platform A with face to the front. Then the screws 39 39', holding the stanchion or uprights B' B', are loosened, and the latter, carrying the lever-arms, rest, and other appliances, are raised to a height that will bring rest 7' under the pupil's left arm. Then the violin and bow are placed in his hands and positioned by the instructor. Then lever-arm 5, which carries the violin head-rest, is adjusted laterally to the desired angle and the head-rest 18 raised or lowered, as desired. Then the arm 6 with its cross-bar 6' is placed outside the left arm at a point near the elbow, the lever being swung laterally until it is at the required angle—i. e., to bring the left arm under the violin as far as necessary—and then fastened by the thumb-screw 50. Then lever 4, carrying the bow-guide, is loosened at its bearings on the block 15, and the bow-guide is brought to the front to a line approximately parallel with the blocks 15 15'. The instructor then looks for a line through the middle of guide D for a point between the bridge of the violin and the end of the finger-board. When this is reached the arm 4 is fastened, as shown. Then the bow-guide is adjusted upwardly or downwardly, as required, by moving the standing post 51 in the collar 30 and fastening it by the thumb-screw. Then the guide proper is adjusted laterally on the part 29 of the guide-holder and fastened, as shown at 28, the object being to have the strings of the instrument at the point where the bow passes over them form the center of the concentric arcs described by the rims of the bow-guide. Then the lever-arm 16 and extension part 10 are brought up to the back of the upper part of the pupil's arm by means of the hinged adjustment 17 and fastened so that the student's arm can go back only the required distance in bowing. Then when the pupil has the cord 11 and the strap 8 or metal substitute for the strap 9 adjusted by the instructor, as hereinbefore indicated, he is ready for practice.

Having thus described my invention, what I claim as new, and desire to secure by Letters Patent, is—

1. The apparatus consisting of a platform and movable uprights to which are attached adjustably the left-elbow rest, the violin head-rest, the bow-guide, the bow-guide holder, the laterally adjustable right-arm rest working in slots in the back-support, the back-support, the cord and belt, and hinged and sliding rods for operating the same, all in the manner shown and described and for the purposes specified.

2. In an apparatus for attaining the correct position for violin-playing, the combination of a violin-rest, and a bow-guide arranged at one side of the violin-rest and adapted to define the plane of movement of the bow.

3. In an apparatus of the character described, the combination with the standards, of a back rest or cushion hinged at one end to one of the standards and having its opposite end adjustably supported by the other standard.

4. The combination of the supporting-standards, a back-rest hinged at one end to one of the standards, a rod adjustably secured to the other standard and extending to the free end of the back-rest, and a supporting-bar hinged to the end of the said rod and playing in a recess or mortise in the back-rest.

5. The combination with the standards, of an adjustable back-rest supported thereby, and a body-holding rod adjustably secured to the back of the back-rest and projecting through the same to bear against the side of the player's body.

6. The combination with the standards, and the cushion hinged to one of said standards, of a rod adjustably secured to the other standard and supporting the free end of the cushion, and a rest secured to the free end of said rod in advance of the cushion.

7. The combination with the supporting-frame, of a swinging arm adjustably mounted thereon, a rod depending from the free end of said arm, a spring-pressed bar pivotally mounted on the front side of said rod, and a set-screw mounted in the rod and bearing against the lower end of said bar.

8. In an apparatus of the character described, a bow-guide consisting of a quadrantal casing.

9. The combination with the supporting-frame, of a horizontally-swinging extensible arm adjustably mounted on the supporting-frame, and a stop-rod adjustably secured to the free end of said swinging extensible arm and depending therefrom.

NICHOLAS SCHENK.

Witnesses:
H. C. SHOBE,
E. J. O'BRIEN.